UNITED STATES PATENT OFFICE.

KARL SCHMID, OF ALT-MUGELN, NEAR MUGELN, LEIPZIG, GERMANY, ASSIGNOR TO THE FIRM OF "LIPSIA" CHEMISCHE FABRIK, ACTIEN-GESELLSCHAFT, OF MUGELN, LEIPZIG, GERMANY.

PROCESS FOR MAKING INSULATING MATERIAL FROM BASIC MAGNESIUM CARBONATE AND FIBROUS SUBSTANCES.

1,228,609.

Specification of Letters Patent.

Patented June 5, 1917.

No Drawing.

Application filed November 9, 1916. Serial No. 130,333.

*To all whom it may concern:*

Be it known that I, KARL SCHMID, a subject of the King of Wurttemberg, and residing at Alt-Mugeln, near Mugeln, district of Leipzig, Saxony, Germany, have invented certain new and useful Improvements in Processes for Making Insulating Material from Basic Magnesium Carbonate and Fibrous Substances, of which the following is a specification.

It is a known fact that magnesium carbonate and in particular the basic magnesium carbonate possesses a high insulating power. Insulating material has also heretofore been made of the latter salt with and without an admixture of fibrous substances; for making such insulating material ground magnesite was treated under pressure with a limited volume of carbonic acid, which barely sufficed to produce the basic magnesium carbonate. These basic magnesium carbonates thus obtained have, to a certain extent, the hydraulic properties of the magnesite and will, when pressed in molds, form bodies which will set subsequently and which possess a comparatively high mechanical strength. Compared to the commercial basic magnesium carbonate they are, however, rather heavy, and it is a known fact that the insulating power of a substance increases in proportion to its lightness caused by its porosity. The insulating power of such commercial basic magnesium carbonate, commonly termed magnesia alba, is therefore greater than that of a basic magnesium carbonate prepared in the aforesaid manner. The said magnesia alba however, has no great tendency to combine with fibrous substances, such as asbestos, cocoanut fibers, hairs, fibrous peat and the like, so that the manufacture of insulating material from such basic magnesium carbonate and fibrous substances offers considerable difficulties.

It has now been found that it is possible to produce excellent insulating material from magnesia alba and fibrous substances, which materials will equal in lightness the said magnesia alba and will even exceed as to lightness and heat insulating power the product prepared after the hereinbefore mentioned process.

The present invention consists essentially in that the basic carbonate is deposited *in statu nascendi* onto fibrous substances. This is obtained by producing a normal magnesium carbonate by letting a carbonate compound of ammonia (carbonate of ammonia or bicarbonate of ammonia in solution) act on oxid of magnesium hydroxid suspended in water and then converting said magnesium carbonate by the action of heat into basic magnesium carbonate and finally combining the mixture of such reaction with the fibrous substances to be employed. Example: To an aqueous suspension of magnesium oxid (for example finely ground calcined magnesite) or magnesium hydroxid, to which a suitable volume of fibrous substances, such as asbestos, cocoanut fibers, hairs, fibrous peat or the like has been added, a solution of carbonate or bicarbonate of ammonia is added, which contains at least one molecule of carbonic acid to every molecule of magnesium oxid, whereupon said mixture is heated to a temperature of 50° Celc. The mixture which, at first, is thin, will gradually become thick by the magnesium oxid suspended therein, without apparently being dissolved, swelling to its multiple volume and forming a hydrous normal magnesium carbonate. The ammoniacal liquid is then removed and the remaining substance is dried. During this drying process carbonic acid will be discharged and the hydrous normal magnesium carbonate changes into basic carbonate.

Instead of proceeding in the aforesaid manner, the normal magnesium carbonate may also be prepared without adding the fibrous substances, then removing the ammoniacal liquid, adding water and finally stirring and heating the mixture. In this case also carbonic acid will be discharged and the hydrous normal magnesium carbonate will change into the basic carbonate. The fibrous substances may then be added to the product of the reaction. The finished product of the reaction may thereupon be either dried or filtered into molds and allowed to set in these. By such procedure an insulating material, or shaped bodies thereof, are obtained, which are remarkable for their extreme lightness and their exceptionally high heat insulating power.

I claim:

1. The process of making insulating material from basic magnesium carbonate and fibrous substances, consisting in depositing basic magnesium carbonate on fibrous substances *in statu nascendi*.

2. The process of making insulating material from basic magnesium carbonate and fibrous substances, consisting in converting normal magnesium carbonate, produced by the reaction of a carbonate compound of ammonia on magnesium oxid suspended in water, by means of the action of heat into basic magnesium carbonate and adding the fibrous substances to the pasty product of said reaction.

3. The process of making insulating material from basic magnesium carbonate and fibrous substances, consisting in converting normal magnesium carbonate produced by the reaction of a carbonate compound of ammonia on magnesium hydroxid suspended in water, by means of the action of heat into basic magnesium carbonate and adding the fibrous substances to the pasty product of said reaction.

4. The process of making insulating material consisting in depositing normal magnesium carbonate on a mass of fibrous substances suspended in a solution containing magnesium oxid by the reaction of a carbonate compound of ammonia therewith, thereupon filtering off the liquid and drying the remaining mass, the said normal magnesium carbonate being thereby converted into the basic magnesium carbonate.

5. The process of making insulating material consisting in depositing normal magnesium carbonate on a mass of fibrous substances suspended in a solution containing magnesium hydroxid by the reaction of a carbonate compound of ammonia therewith, thereupon filtering off the liquid and drying the remaining mass, the said normal magnesium carbonate being thereby converted into the basic magnesium carbonate.

6. The process of making insulating material consisting in depositing normal magnesium carbonate on a mass of fibrous substances suspended in an aqueous solution containing magnesium oxid by the reaction of a carbonate compound of ammonia therewith, thereupon filtering off the liquid and boiling the remaining mass with water, the said normal magnesium carbonate being thereby converted into the basic magnesium carbonate.

7. The process of making insulating material consisting in depositing normal magnesium carbonate on a mass of fibrous substances suspended in an aqueous solution containing magnesium oxid by the reaction of a carbonate compound of ammonia therewith, thereupon filtering off the liquid and mixing the remaining mass with water, the said normal magnesium carbonate being thereby converted into the basic magnesium carbonate which is deposited onto the fibrous substances.

8. The process of making insulating material consisting in depositing normal magnesium carbonate on a mass of fibrous substances suspended in an aqueous solution containing magnesium hydroxid by the reaction of a carbonate compound of ammonia therewith, thereupon filtering off the liquid and mixing the remaining mass with water, the said normal magnesium hydroxid being thereby converted into the basic magnesium carbonate which is deposited onto the fibrous substances.

9. The process of making insulating material from basic magnesium carbonate and fibrous substances, consisting in depositing basic magnesium carbonate *in statu nascendi* on fibrous substances, the product of said reaction being filtered off into molds and there allowed to set.

In testimony whereof I affix my signature in presence of two witnesses.

Dr. KARL SCHMID.

Witnesses:
Rudolph Fricke,
R. H. Seagle.